(No Model.)

B. S. BENSON.
TRACTION ENGINE.

Patented Jan. 12, 1886.

Fig. 1.

WITNESSES:
Fred. G. Dieterich
Edw. M. Byrn.

INVENTOR:
B. S. Benson
BY Munn & Co
ATTORNEYS.

N. PETERS, Photo-Lithographer, Washington, D. C.

(No Model.)

B. S. BENSON.
TRACTION ENGINE.

No. 334,333. Patented Jan. 12, 1886.

WITNESSES:
Fred. G. Dieterich
Edw. W. Byrn

INVENTOR:
B. S. Benson
BY Munn & Co
ATTORNEYS.

(No Model.) 10 Sheets—Sheet 6.

B. S. BENSON.
TRACTION ENGINE.

No. 334,333. Patented Jan. 12, 1886.

WITNESSES:
Fred. G. Dieterich
Edw. W. Byrn

INVENTOR:
B. S. Benson
BY Munn & Co.
ATTORNEYS.

(No Model.) 10 Sheets—Sheet 7.

B. S. BENSON.
TRACTION ENGINE.

No. 334,333. Patented Jan. 12, 1886.

WITNESSES:
Fred. G. Dieterich,
Edw. W. Byrn.

INVENTOR:
B. S. Benson
BY Munn & Co
ATTORNEYS.

(No Model.) 10 Sheets—Sheet 8.

B. S. BENSON.
TRACTION ENGINE.

No. 334,333. Patented Jan. 12, 1886.

WITNESSES:

INVENTOR.

ATTORNEYS.

(No Model.) 10 Sheets—Sheet 9.

B. S. BENSON.
TRACTION ENGINE.

No. 334,333. Patented Jan. 12, 1886.

WITNESSES:
Fred G. Dieterich
Edw. W. Byrn.

INVENTOR:
B. S. Benson
BY Munn & Co.
ATTORNEYS.

(No Model.) 10 Sheets—Sheet 10.

B. S. BENSON.
TRACTION ENGINE.

No. 334,333. Patented Jan. 12, 1886.

WITNESSES:
Fred G. Dieterich.
Edw. W. Byrn.

INVENTOR:
B. S. Benson
BY 
ATTORNEYS.

N. PETERS, Photo-Lithographer, Washington, D. C.

United States Patent Office.

BENJAMIN S. BENSON, OF BALTIMORE, MARYLAND.

TRACTION-ENGINE.

SPECIFICATION forming part of Letters Patent No. 334,333, dated January 12, 1886.

Application filed July 30, 1885. Serial No. 173,045. (No model.)

*To all whom it may concern:*

Be it known that I, BENJAMIN S. BENSON, a citizen of the United States, residing at Baltimore city, in the State of Maryland, have invented a new and useful Improvement in Traction-Engines, of which the following is a description.

The object of my invention is to provide a practical steam traction-engine for pulling a gang of plows for the cultivation of land on a large scale.

My invention relates to that class of traction-engines in which an endless chain is provided with feet, for contact with the ground, and sectional guide-rails, which support the truck-wheels of the body of the engine and form a track upon which the latter runs.

My invention consists in such details of construction and improved combinations of parts as tend to reduce the friction, increase the motive power, and facilitate the guiding of the engine, as will be hereinafter fully described.

Figure 1:
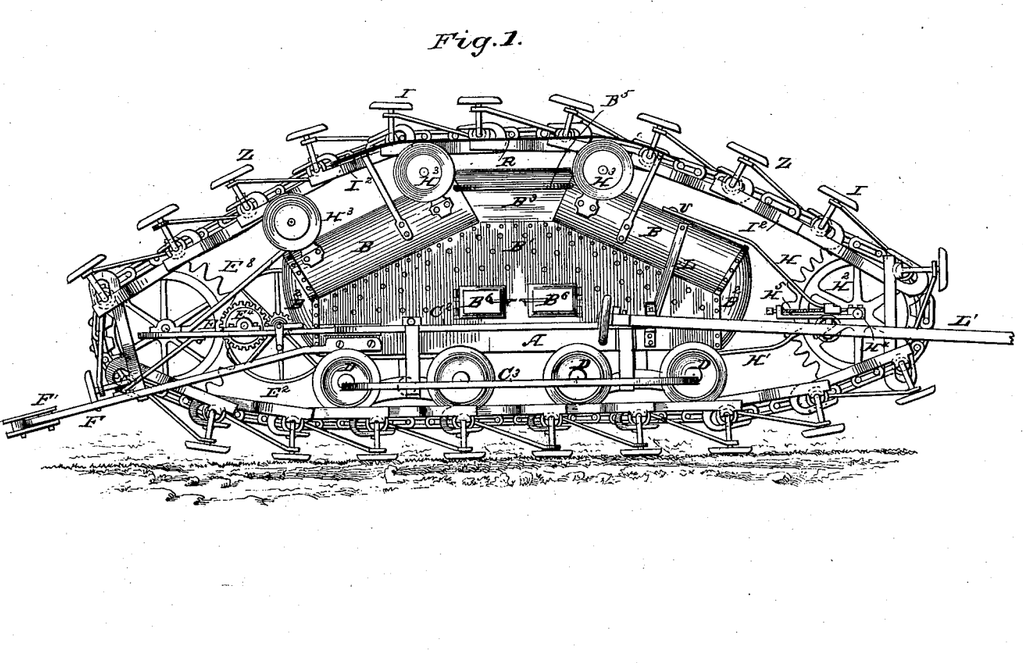
Figure 1 is a side elevation of the traction-engine with the pilot broken away.
Figure 6:
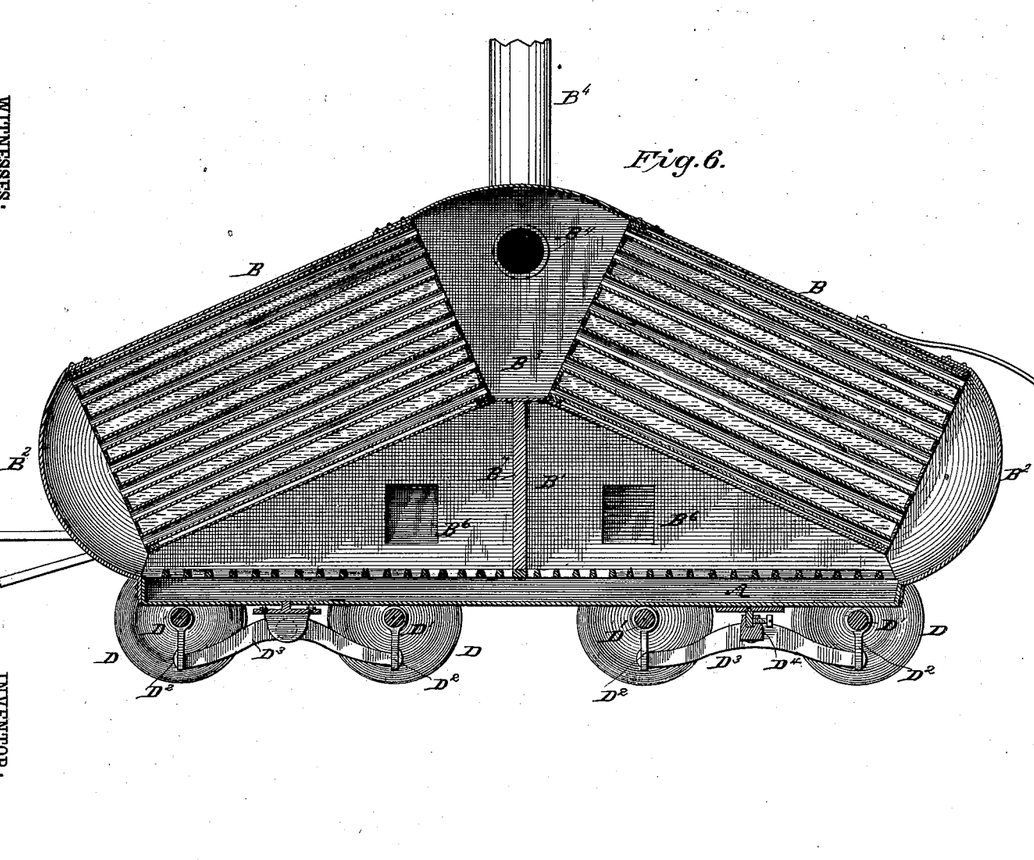
Fig. 6 is a vertical longitudinal section of the boiler and trucks.

In the drawings, A A, Figs. 1 and 6, represent the bottom plates of the boiler, which rest upon their respective trucks and carry the weight of the boiler.

B B B' is the boiler, which consists of two obliquely-arranged cylindrical boilers having their higher ends in the middle and next to each other. The space beneath the two cylinders forms the fire-box, which fire-box has upon each side hollow compartments or water-legs B', Fig. 7, which communicate through holes in the boiler with the water and steam space of the same. At the ends of the two oblique cylinders there are smoke boxes or hoods $B^2\,B^2$, which communicate with the flues or tubes of the boilers, and also with the fire-box at the lower ends of the boiler. At the top of the cylinders the flues communicate with another smoke-box, $B^3$, which covers the space at the ends of the two oblique cylinders, and from which, on one side of the engine, the smoke-pipe $B^4$ emerges. Communicating with the tops of the two cylinders is a steam-pipe, $B^5$, Fig. 1, which equalizes steam-pressure, and from which dry steam is taken off to the engine. (Not shown.)

$B^6\,B^6$ are furnace-doors opening through one of the water-legs of the boiler into the fire-boxes beneath each boiler, the space beneath the two boilers being divided into two fire-boxes by a middle partition, $B^7$, Fig. 6, so that either boiler may be used at pleasure, or both, if desired. The hot air, flames, and products of combustion in the fire-boxes, pass outwardly to the lower ends of the cylindrical boilers, then turn into the smoke-boxes $B^3$, then up through the flues or tubes of the boiler into the central or upper smoke-box, and thence out the smoke-pipe.

Just below the furnace-doors are fastened by bolts two step-irons, C C', Figs. 3, 5, 7, upon which are disposed two platforms, $C^2\,C^3$, that carry the engine, (not shown,) and give also standing-room to the engineer.

Figure 7:
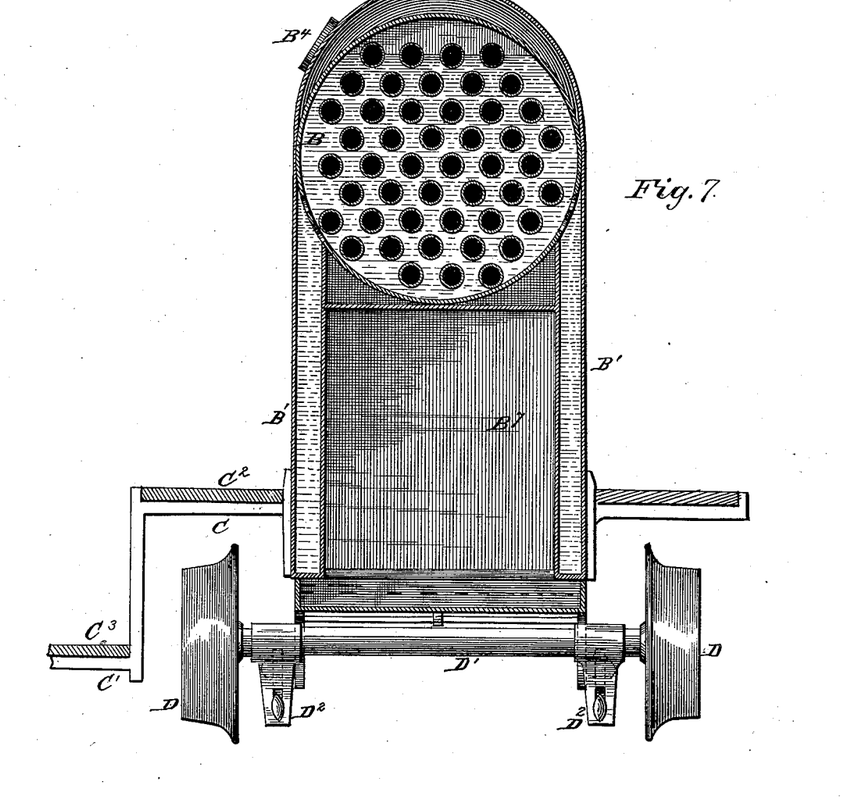
Fig. 7 is a vertical transverse section of the boiler and trucks.

Under the bottom plates, A A, of the boiler are arranged the supporting-trucks, Figs. 6 and 7, consisting each of four flanged wheels, D, which are fastened together in pairs by transverse shafts D', from which shafts are suspended the pendent bars $D^2$, in the lower ends of which are supported the horizontal longitudinal bars $D^3$, which, in the middle, support a cross bar or plate, $D^4$, upon which the plates A are stepped, so as to turn about a vertical center. This bar $D^4$ may be a plain bar journaled in the side bars, D³, as shown on the right of Fig. 6; or it may be constructed as an elevated plate or turn-table, as shown on the left, with anti-friction rollers arranged on its surface to carry the plates A.

Figure 3:
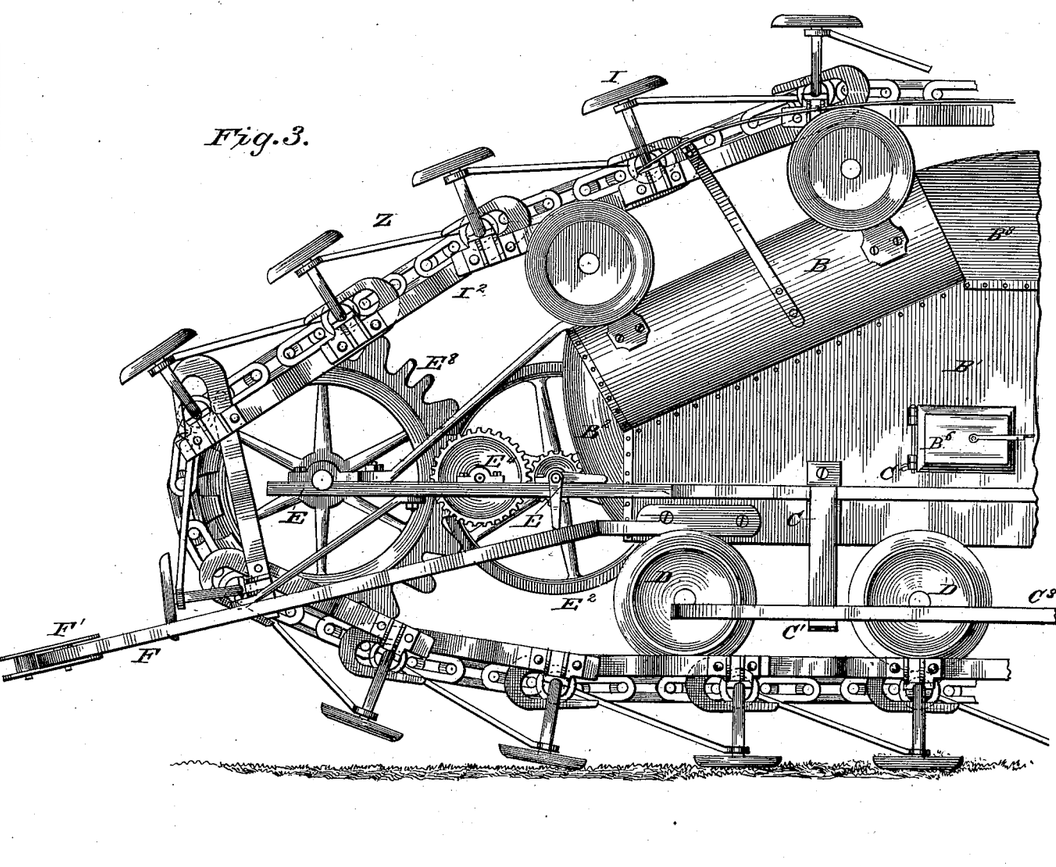
Fig. 3 is a side elevation, on a larger scale, of the rear end of the traction-engine.
Figure 5:
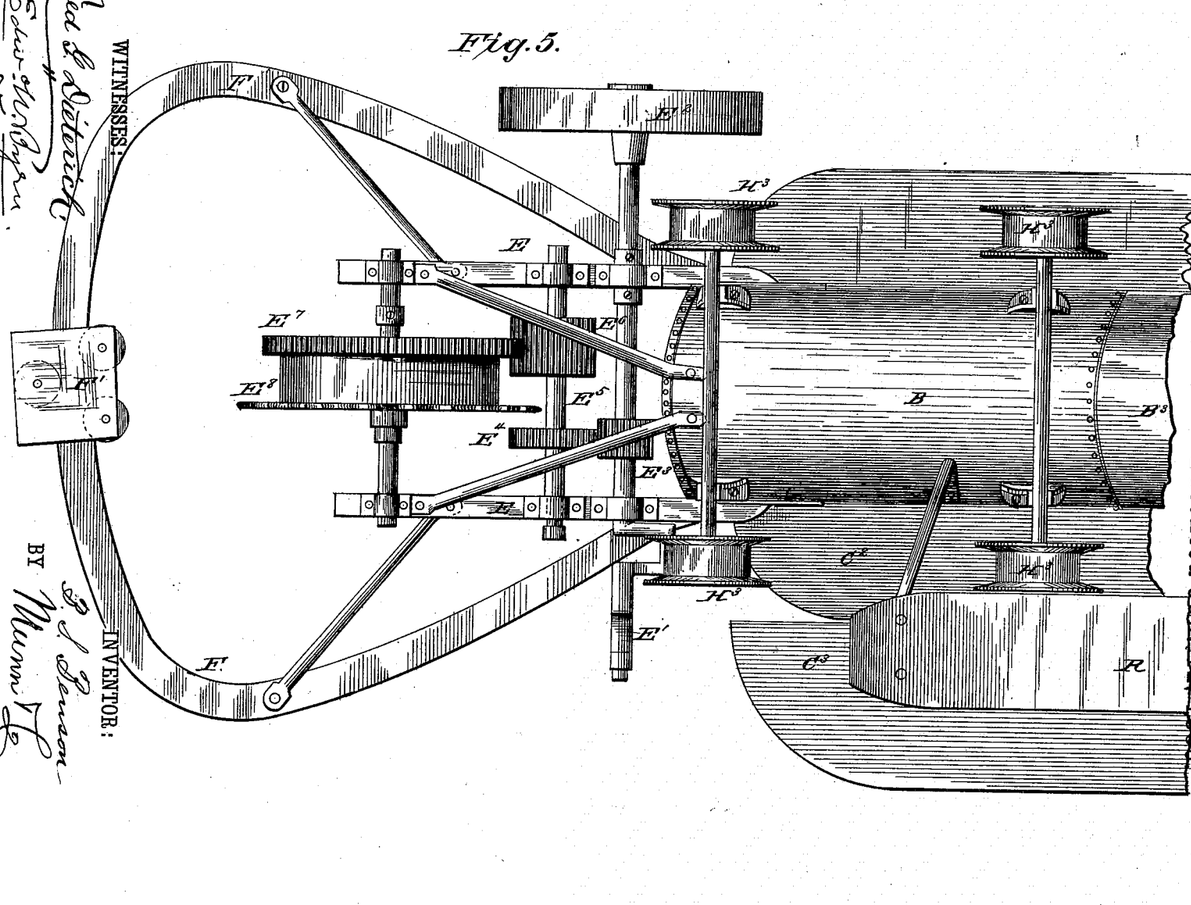
Fig. 5 is a plan view of the rear portion of the traction-engine as shown in Fig. 3, the chain being removed.

To the rear end of the boiler are bolted the horizontal bars E, Figs. 3 and 5, and the draft-bar F, to which the gangs of plows are to be attached. This draft-bar is of a bail shape, and its rear middle or bowed portion is bent to the curve of a circle struck from the center of the engine, and this curved draft-bar forms a rail, upon which slides the draft-block F', which forms the immediate connection for the plows, and which is provided with anti-friction rollers to permit it to slide freely from side to side.

On the bars E (of which there is one on each side of the boiler) there is sustained in suitable journal-boxes a crank-shaft, E', Fig. 5, to which motion is transmitted from the engine, and which crank-shaft is provided with a fly-wheel, E², and a pinion, E³, which latter engages with a gear-wheel, E⁴, on a cross-shaft, E⁵, and which shaft E⁵ has a very wide pinion, E⁶, that engages with the gear E⁷ of the combined gear and sprocket wheel E⁷ E⁸. The object in making the pinion E⁶ so wide is to permit the sprocket-wheel to move laterally, to facilitate the turning of the engine and still preserve the connection between said pinion and sprocket-wheel. This sprocket-wheel carries at one end of the machine the endless track or draft chain, and said sprocket-wheel is loose on its shaft, which is held firmly on the ends of the supporting-bars E E, the said sprocket-wheel being limited in its free side play on its shaft by collars.

Figure 2:
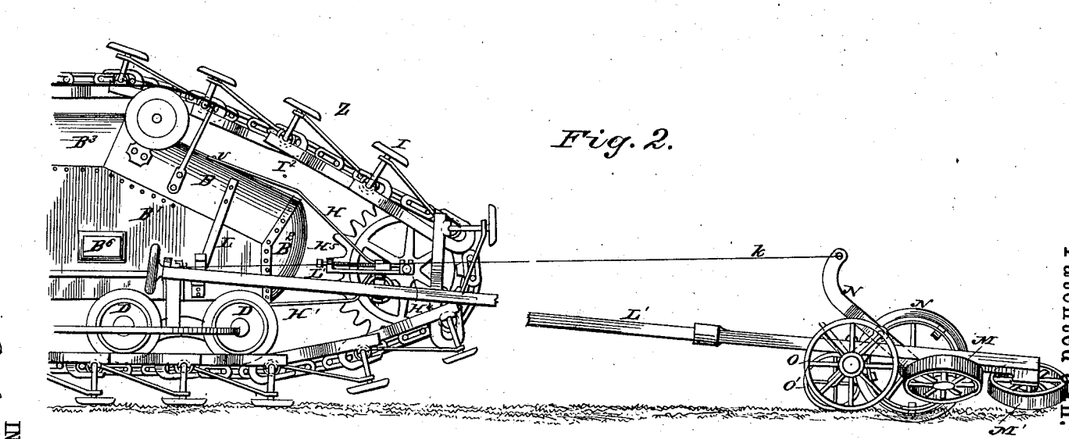
Fig. 2 is a side elevation of the front half of the traction-engine, showing the pilot.

In front of the steam-boiler, and journaled in a swinging frame, H H', Figs. 1 and 2, is another sprocket-wheel, H², similar to the sprocket-wheel E⁸. The frame H H' of this wheel is pivoted vertically to the boiler at v, so as to allow the same to swing from side to side after the manner of a clevis, the object being to permit the front sprocket and the front end of the track-chain, which it carries, to be deflected to either side, to facilitate turning or guiding the machine, as shown by dotted lines, Fig. 4.

Figure 14:
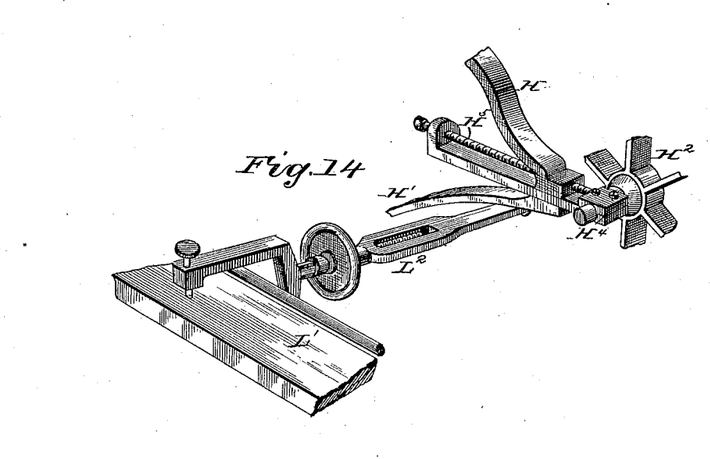
Fig. 14 is a perspective view of the adjustable connection between the pilot-beam and front sprocket-wheel frame.

The sprocket-wheel H² is constructed with teeth exactly like sprocket E⁸, and these sprocket-wheels serve, in connection with flanged pulleys H³ on the boiler, to support and carry the endless traction or draft chain. The rear one, E⁸, of the sprocket-wheels derives its motion from the engine and drives the chain, while the front sprocket-wheel, H², serves to guide the engine, and at the same time serves as a tension-regulator for the endless chain, for which latter purpose the journals which carry the sprocket-wheel shaft are formed in adjustable sliding bars H⁴, Figs. 1 and 14, which are drawn in to loosen or protected out to tighten the endless chain by means of screw-rods H⁵. This permits the chain to be slackened to allow its sections to be removed and repaired or replaced, and also forms a tension-abutment to take up looseness or wear.

I will now proceed to describe the draft or traction chain Z. This consists (see Figs. 10, 11, 12) of a middle or draft section, feet for resting upon the ground, and jointed side-rail sections which form the track, which is laid down in front of the engine, and is picked up in rear of the same, and which supports the truck-wheels of the engine, and is supported as it passes over the engine by the flanged guide-wheels H³. This draft-chain passes inside the bail-shaped draft-bar F, and is constructed as follows:

I are the supporting-feet of the draft-chain, which are convex disks screwed upon the ends of cross-shafts I', which are bent nearl at right angles at their ends, so as to main in the chain at a suitable distance from e ground. At the ends of the horizontal p tions of these cross-shafts the sectional siue rails are secured. There is one of these sectional side rails on each side of the draft-chain, and they form the track upon which the truck-wheels of the engine run. These track-rails are formed of sections I², which at one end are firmly clamped to the ends of the cross-shafts by a special form of chair or coupling, Fig. 8, and at their other ends each is provided with a hook that embraces the coupling of the next section. A chain rail or track is thus made (see Fig. 1) which in turning the sprocket-wheel, is capable of automatic adjustment and adapts itself to the different positions with ease and without much friction.

Figure 8:
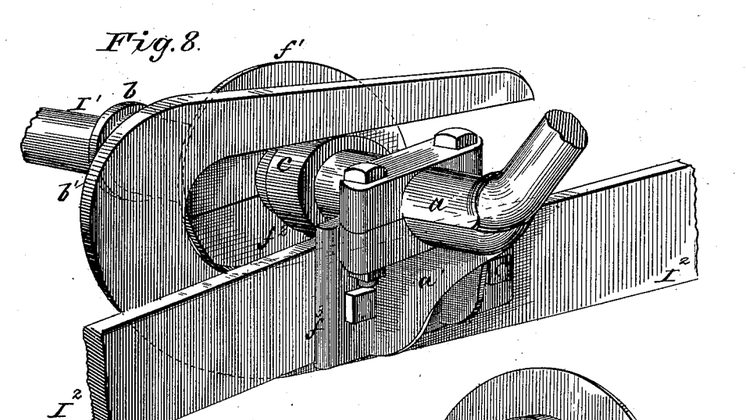
Fig. 8 is a perspective view of the coupling for the track-sections and cross-shafts.
Figure 9:
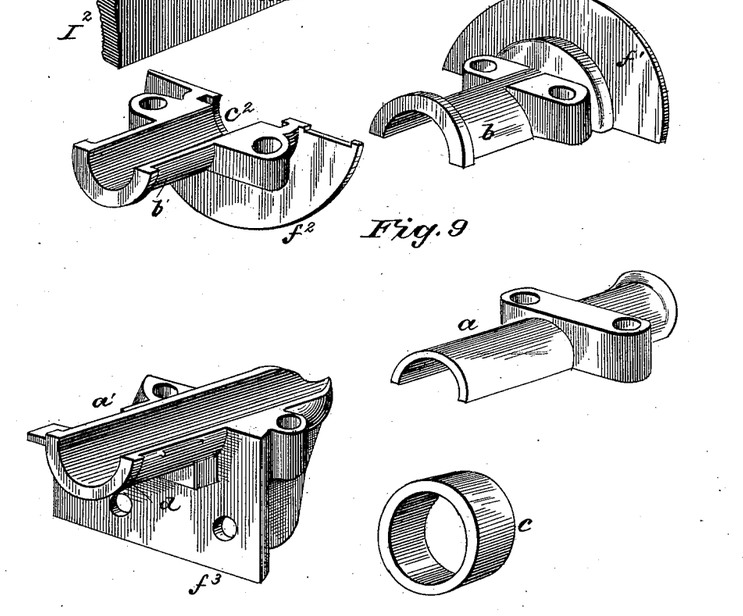
Fig. 9 represents detached views of the parts of this coupling.

The coupling for fastening these rail-sections to the cross-shafts consists of five pieces, $a$, $a'$, $b$, $b'$, and $c$, Figs. 8 and 9. The parts $a$ $a'$ are in the nature of a clamp-box fastened together upon the cross-shaft at the bend of the same. One of these pieces, $a'$, is formed with a flat face, $f^3$, to which is bolted one end of the rail-sections I². The inner ends of these clamp-boxes are made circular, and are encompassed by a ring or collar, $c$, upon which bears the hook of the next rail section. The inner end of one of these boxes is also formed with a lip, $d$, that is caught by a recess, $c^2$, in flange-section $b$ $b'$, each of which has a semi-circular flange, $f'$ $f^2$, to hold the hook of the rail-section on the collar $c$. These two flange-sections are bolted together upon the cross-shafts, and are prevented from leaving the parts $a$ $a'$ by the lip $d$. This coupling makes a strong, durable, and substantial joint, and as the collar $c$ wears, from the friction of the hooks on the rail-sections, it is removed and replaced by a new one.

Figure 10:
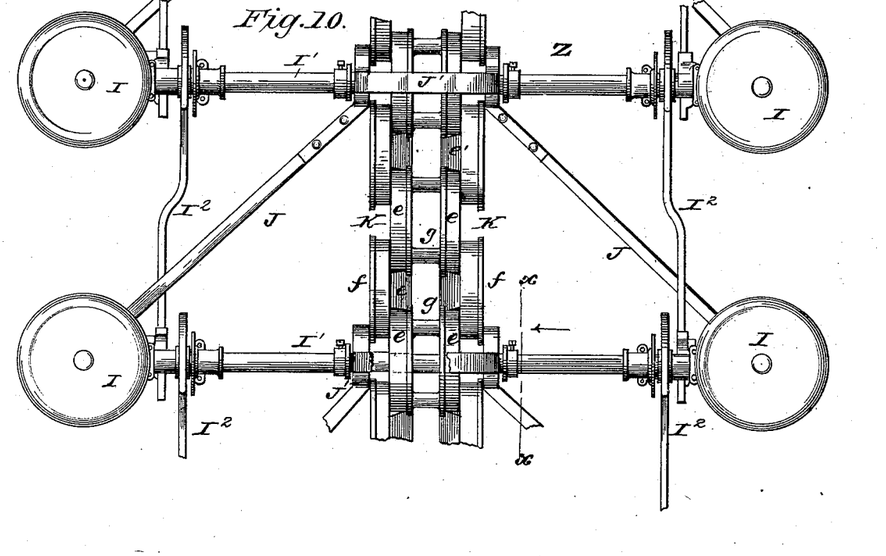
Fig. 10 is an enlarged plan view of the chain.
Figure 11:
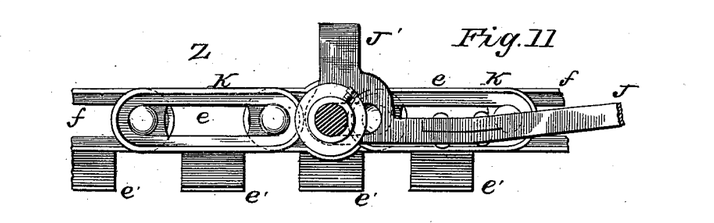
Fig. 11 is a cross-section through the line $x\,x$ of Fig. 10.
Figure 12:
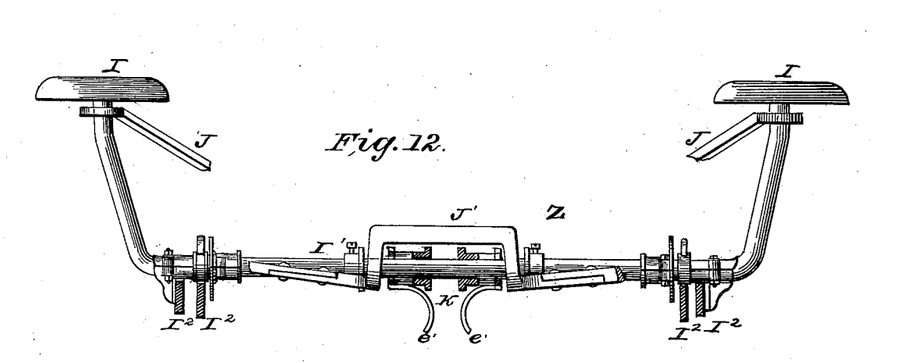
Fig. 12 is a cross-section of the chain at right angles.

To brace the feet of the chain against their pulling strain brace-rods J J, Figs. 10, 11, 12, run from each foot to a yoke-piece, J', which is loosely hinged upon the cross-shafts of the feet and embraces the middle or draft chain. At the point where the cross-shaft passes through these yokes the holes are enlarged or slotted, as in Fig. 11, to compensate for the slight change of position in turning the sprocket-wheels and give a free, easy, and loose motion. To facilitate construction, the brace-rods J are bolted to these yoke-pieces, instead of being formed in one piece with them.

K is the middle or draft chain, which is composed of a succession of links, $e\ e$ and $f\ f$, jointed together upon cross-pins $g$, between which cross-pins the prongs of the sprocket-wheels project, and against which the latter bear in turning the chain.

In former constructions of draft-chains having cross-shafts and supporting-feet the cross-shafts have been made to form the pintle-pin of the joint of the chain-links. I have found that this involves a very serious objection in the form of a friction that uses up much of the power of the machine and destroys in a great measure its efficiency. Thus when the cross-shafts of the feet form the pintles of the chains, the great strain of the driving-chain in propelling the engine is thrown entirely upon the cross-shaft at its hinge-point with the links, and as these shafts are obliged to have an axial or rocking motion in the eyes of the links in turning the sprocket-wheels it will be seen that this axial or rocking motion must take place under the great tension of the drive-chain, which, as a matter of course, involves an immense amount of friction, as above mentioned. To relieve the machine of this, I locate the cross-shafts at a point in the chain which is outside or between the joints of the links—$i.\ e.$, the shaft is passed through an opening in the middle of one set of links of the draft-chain, where the strain of the draft-chain does not come upon it at all, and by this arrangement I obviate a great loss of power, and also the wear incident to the great friction.

It has already been stated that in order to facilitate the guiding of the machine the sprocket-wheels are free to move sidewise, so as to lay the track down and pick it up in a curve line. It will be perceived, however, that in doing this there is a tendency of the chain to run off of the sprocket-wheel, which is greatly increased by the looseness resulting from the wear of the chain and sprocket-wheel.

To prevent the chain from running off the sprocket-wheels, each link of the chain is formed with a bevel-lug, $e'$, Figs. 11 and 12, upon the inside of the links, which forms a tapering throat, that causes the prongs of the sprocket-wheels to be guided with certainty into the spaces between the pintle-pins of the links, thus avoiding the dislocation of the chain from the sprocket-wheel.

I will now proceed to describe the means for guiding the engine by co-operating with the laterally-adjustable front sprocket-wheel. To the boiler, near its front end, is firmly attached the bracket-arm L, Figs. 1 and 4, to which is pivoted by a vertical bolt a long pilot-beam, L', extending some distance in advance of the engine and attached to a group of pilot-wheels. A short distance in advance of the bracket L this pilot-beam is attached to the laterally-swinging frame of the sprocket-wheel by an adjustable bar, $L^2$, Figs. 4 and 14, having a hand-wheel, screw, and a link-nut, for increasing or diminishing the length of the bar $L^2$. As the pilot-beam moves from side to side, it will be seen that it oscillates about its rear pivot-bolt as a fixed center, and it acts as a lever upon the bar $L^2$, to throw the front sprocket-wheel frame to either side according to the direction of the movement of the pilot. This pilot consists of two diagonally-set wheels, M and M', one of which, M, bears against the wall of unplowed ground left by the last furrow, and the other of which wheels, M', bears against the ridge or back of the last furrow, and thus guiding the traction-engine straight in a line parallel to the last furrow.

Figure 4:
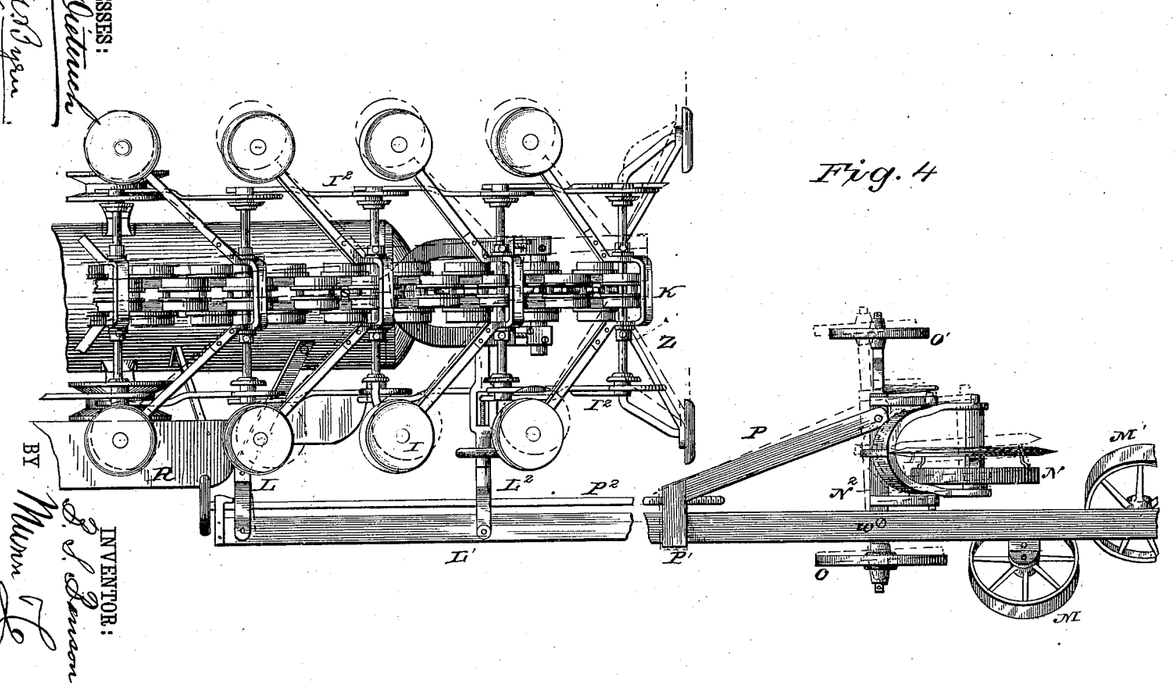
Fig. 4 is a plan view of the front portion of the traction-engine as shown in Fig. 2.
Figure 13:
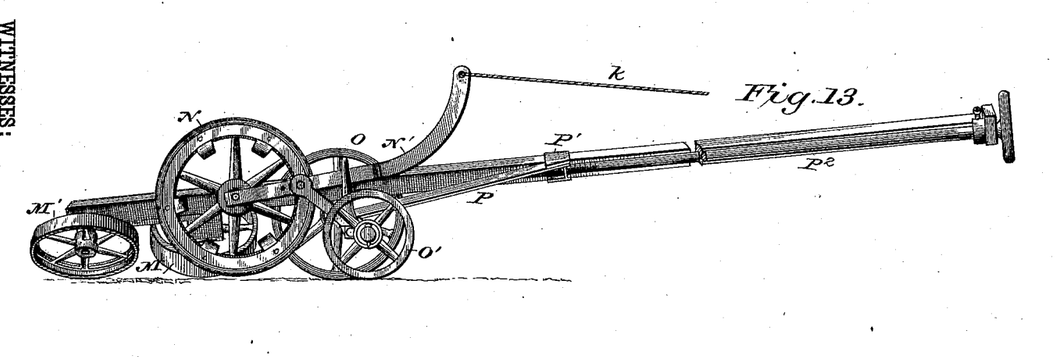
Fig. 13 is a side elevation of the pilot and pilot-beam.

To guide the engine, a rolling colter-wheel, N, Figs. 4 and 13, with a sharp circular blade, is carried by a forked frame, N', which is fulcrumed or trunnioned about its middle in supports rising from an axle, $N^2$. This forked frame is provided with a cord, $k$, at its upper end, by pulling upon which from the engine, Fig. 2, the colter-wheel may be raised out of the ground, and by releasing which cord the colter may be allowed to drop down upon and cut into the ground, the colter being weighted for this purpose. This colter serves to guide the engine in running the first furrow, after which the colter is raised and the guiding done by the diagonal wheels. The axle $N^2$ is pivoted upon a vertical center bolt, $w$, Fig. 4, beneath the pilot-beam, and is capable of being turned to guide the colter-wheel to the right or left. Upon the opposite ends of the axle are the two carrying-wheels O O', one of which, O, is the larger and runs down in the furrow, and the other of which, O', is smaller and runs upon the unplowed ground. This wheel O' has an adjustable crank to raise and lower the same after the manner of the adjustable wheel of a sulky-plow.

In order to turn the axle $N^2$, to guide the colter-wheel, an arm, P, Fig. 4, extends from the axle rearwardly to a sliding loop, P', which encompasses the pilot-beam. Through a screw-threaded hole in this loop is arranged the screw-threaded end of a long rod, P, which is arranged in bearings along the pilot-beam and terminates in a hand-wheel near the engine. By turning this hand-wheel it will be seen that the loop P' and arm P are drawn up or forced down, as the case may be, and the axle of the pilot is correspondingly deflected to the right or left, and the colter-wheel is correspondingly turned in the soil to the right or left, and is made to carry the pilot and its beam to the right or left, and the pilot-beam, acting upon the front sprocket-wheel frame as a lever, throws it to the right or left, as in dotted lines, Fig. 4, and thus guides or turns the engine.

To protect the engineer from dirt, that may fall from the feet as they pass above him, a shield or roof, R, is arranged above his head just above the platform upon which he stands. The hind end of the pilot-beam is so pivoted to the sprocket-wheel frame and boiler that the lateral thrust is more on the sprocket-wheel frame than would be indicated by the front end of the pilot, this being necessary to prevent crowding laterally, and make the engine steer up nicely to the previous furrow.

Having thus described my invention, what I claim as new is—

1. In a traction-engine, the combination of two obliquely-arranged cylindrical boilers having their inner ends the highest, a fire-box beneath the same, sprocket-wheels at the ends of the boilers, and an endless track-chain with feet passing beneath, around, and over the boiler, and guide and truck wheels for the chain, substantially as and for the purpose described.

2. In a traction-engine, the combination of two obliquely-arranged cylindrical boilers having their inner ends the higher, and provided with tubes through the same and smoke-boxes both at their ends and in the middle, a fire-box with partition arranged beneath the boilers and communicating with the end smoke-boxes, double doors for the fire-boxes, sprocket-wheels at the ends of the boiler, trucks beneath the same, and an endless track-chain disposed around the boiler and wheels for supporting the same, substantially as described.

3. In a traction-engine, the combination of two obliquely-arranged cylindrical boilers having their inner ends the higher and provided with tubes through the same, a fire-box beneath the same with hollow sides forming water-legs communicating with the boiler, the sprocket-wheels at the ends of the boiler, trucks beneath the same, and the endless track-chain passing around the boiler, substantially as shown and described.

4. In a traction-engine, the combination of the two obliquely-arranged cylindrical boilers having their inner ends the highest, the fire-box beneath the same, the supporting-trucks at the outer ends of the boiler, the sprocket-wheel, the endless track-chain disposed around the boiler and sprocket-wheels, and the step-irons and platforms arranged on the side of the boilers, substantially as shown and described.

5. In traction-engine, the combination, with the endless track-chain and the steam-boiler, of the supporting-trucks consisting of flanged wheels D, arranged in pairs upon trunnion-shafts D', the pendent bars $D^2$, the horizontal longitudinal bars $D^3$ supported in the pendent bars at their ends, and the cross bar or plate $D^4$, with vertical bolt or swiveling center, substantially as described.

6. In a traction-engine, the combination, with the boiler frame or body of the engine, of a bail-shaped draft-bar having its two ends attached to the rear of the boiler-frame and its middle portion bent to the curve of a circle struck from the center of the engine, a sliding draft-block secured upon the draft-bar, and an endless track-chain arranged to revolve inside the draft-bar, as and for the purpose described.

7. In a traction-engine, the combination, with the boiler and the endless track-chain, of the compound wheel $E^7 E^8$, having one end, $E^8$, formed as a sprocket-wheel and the other end, $E^7$, formed as a gear-wheel, the wide pinion $E^6$, and the driving-gear, substantially as described.

8. In a traction-engine, the combination of the track-chain, the laterally-adjustable driving sprocket-wheel provided with gear-teeth, a set of driving-gears, and a driving-pinion made of a width to accommodate the lateral adjustment of the sprocket-wheel without being disconnected from its gear-teeth, as shown and described.

9. A traction-engine having an endless revolving track-chain and two sprocket-wheels, one for driving the chain and the other for guiding it, both of said sprocket-wheels being made laterally adjustable, as and for the purpose described.

10. The combination, with the boiler-frame in a traction-engine, the sprocket-wheels, and the endless track-chain carried thereby, of a laterally-swinging frame pivoted vertically to the boiler-frame and carrying the front sprocket-wheels, and a front pilot connected to the adjustable frame, for guiding or deflecting the same to the right or left, as described.

11. The combination, with the boiler-frame, the track-chain, and the sprocket-wheels, of an adjustable support, $H^4$, carrying one of the sprocket-wheels, the frame H, and the screw-rods $H^5$, arranged parallel to the plane of the sprocket-wheel, and adapted to adjust the sprocket-wheel, substantially as and for the purpose described.

12. In a traction-engine, the combination, with the endless draft chain with track-sections on the side, of cross-shafts bearing supporting-feet, the said cross-shafts being arranged in the draft-chain at points outside of or between the joints of the links, to prevent friction and loss of power, as described.

13. The combination, with the boiler-frame and sprocket-wheels, of the track-chain consisting of a middle draft-chain, cross-shafts having bent ends with supporting-feet, the side track-sections having one of their ends fastened to the cross-shafts and their other ends formed with hooks that embrace the next cross-shaft, and diagonal braces extending from the supporting-feet of one cross-shaft to the middle parts of the next cross-shaft, as and for the purpose described.

14. The combination, with the cross-shafts and the side track-sections in the track-chain, of the two clamp-pieces $a\ a'$, having lip $d$, the clamp-pieces $b\ b'$, having a recess for hooking over the lip *d*, and semicircular flanges, and the collar *c*, the said clamp-pieces being clamped upon the cross-shaft and forming with the collar a chair or coupling for loosely connecting the cross-shaft with the joint of the side-track sections, as described.

15. In a traction-engine, the combination, with the boiler and sprocket-wheels, of the track-chain having its draft-link formed with beveled lugs projecting at right angles to the links, to cause the teeth of the sprocket-wheel to more certainly enter the spaces of the draft-chain, as shown and described.

16. In a traction-engine, the combination of the boiler, the laterally-adjustable sprocket-wheels, and the draft-chain having its links formed with beveled guide-lugs projecting at right angles to the links, to prevent the lateral movement of the sprocket-wheels from dislodging the chain, as described.

17. The combination, with a traction-engine having an endless track-chain and a laterally-adjustable front sprocket-wheel, of a pilot or guide truck, and a pilot-beam fulcrumed at its rear end to an attachment of the engine and connected by a bar with the adjustable carrying-frame of the sprocket-wheel, whereby the lateral motion or turning of the pilot is transmitted through the pilot-beam as a lever, and is made to correspondingly deflect the sprocket-wheel, as described.

18. The combination, with a traction-engine having an endless track-chain and a laterally-adjustable front sprocket-wheel, of a pilot or guide truck, and a pilot-beam fulcrumed at its rear end to an attachment of the engine, and a bar for connecting the pilot-beam to the sprocket-wheel frame, which connecting-bar is made adjustable in the direction of its length, to increase or diminish the distance between the beam and the sprocket-wheel, as described.

19. The combination, with the traction-engine having a laterally-adjustable front sprocket-wheel, of a front pilot having a rolling colter-wheel, a vertically pivoted axle carrying the same, a pilot-beam, and parallel screw-rod, and an arm and sliding loop attached to said axle and operated upon by the screw-rod, for enabling the engineer to change the plane of the colter and guide the pilot, as set forth.

20. The combination, with the traction-engine having a laterally-adjustable front sprocket-wheel, of a front pilot or truck having a vertically-pivoted axle, a rolling colter mounted in a trunnioned frame on said axle, and a cord extending from said trunnioned frame to the engine, for raising and lowering the colter, a pilot-beam and screw-rod extending to the engine, and an arm and loop attached to the pilot-axle and acted upon by the screw-rod, to deflect the same, substantially as and for the purpose described.

21. In a pilot-steering apparatus, two pulley-faced wheels hung in a diagonal position, so that their square faces will press against the side walls of a guide-furrow, in combination with two square-faced wheels, one running in the bottom of the guide-furrow, so as to hold the diagonal wheels from coming in general contact with the bottom or floor of the furrow, but allowing them to take a firm grip on one or the other sides of the guide-furrow, the other square-faced wheel running on the unplowed ground, and all connected to the pilot-beam, substantially as described.

BENJAMIN S. BENSON.

Witnesses:
JOSEPH B. CLAYTON,
E. A. JAEGER.